UNITED STATES PATENT OFFICE.

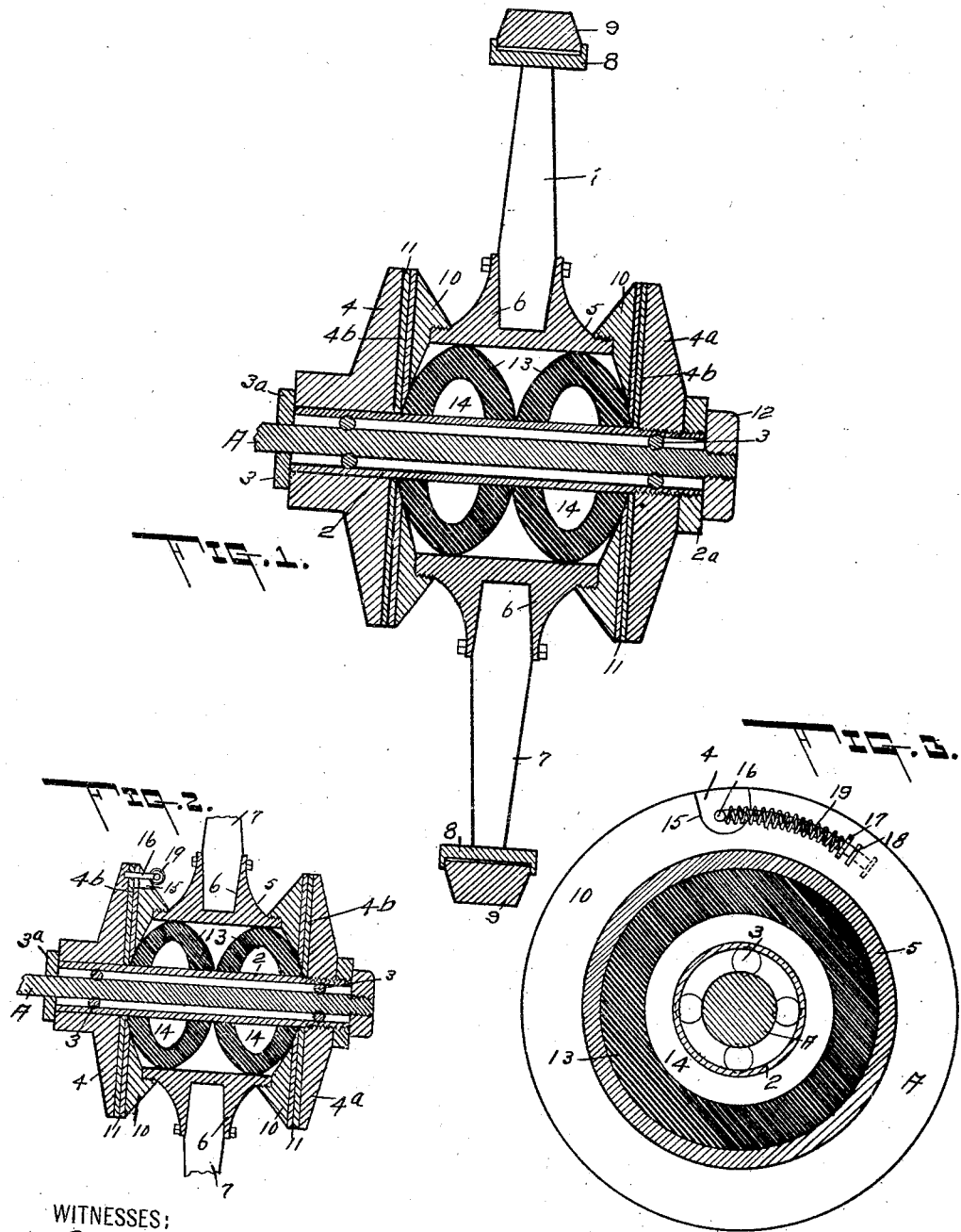

RICHARD JONES, OF BAY CITY, MICHIGAN.

VEHICLE-WHEEL.

No. 857,629.  Specification of Letters Patent.  Patented June 25, 1907.

Application filed June 15, 1906. Serial No. 321,932.

*To all whom it may concern:*

Be it known that I, RICHARD JONES, a citizen of the United States, residing at Bay City, in the county of Bay and State of Michigan, have invented certain new and useful Improvements in Vehicle-Wheels; and I do hereby declare the following to be a full, clear, and exact description of the invention, such as will enable others skilled in the art to which it appertains to make and use the same.

My invention relates to a vehicle wheel, adapted for any vehicle, one object of which is to provide a mechanism which will yield in passing over rough roads to cushion the vehicle body and relieve its occupants or contents from shock.

The principal object of my invention is to obviate the use of inflated tires on vehicles and more especially motor vehicles, whereby the liability of and disadvantages incurred by punctures are totally avoided.

Another object is the provision of a simple, neat and inexpensive vehicle wheel which is light yet strong and one which is easy running and by reason of its construction, may not be easily broken.

A further object of my invention is the provision of a wheel wherein the tire and felly are relieved of the strain and stress usually incident thereto, such strain being taken up or absorbed at the hub of the wheel.

To these and other ends, my invention consists in certain novel features and combinations of parts together with their equivalents, such as will be more fully described hereinafter and particularly pointed out in the claims.

In the accompanying drawings, Figure 1 is a vertical sectional view through a wheel constructed in accordance with my invention, and Figs. 2 and 3 are detail cross sectional views taken at right angles to each other and showing a means for connecting the collar and wheel for transmitting motion from one to the other.

A indicates the axle of any suitable construction, the axle being surrounded by a skein (2) between which may be located ball bearings (3) (3), the axle being provided with a flange (3ª) against which the hub of the wheel abuts. This, of course, forms no part of my invention.

Secured to the opposite ends of the skein are the collars (4) and (4ª), preferably faced as at (4ᵇ) in any suitable manner. The inner collar (4) may be shrunk or otherwise fixedly secured on the inner end of the skein, the outer collar (4ª) being threaded on the outer end of the skein so that it may be removed, a jam nut (2ª) retaining the collar in position.

A sleeve (5) is mounted on the axle, the sleeve being of considerably larger diameter than the skein and axle, and having the sockets (6) (6), cast or otherwise formed thereon to receive the inner ends of the spokes (7) (7), the outer ends of which spokes are suitably secured to a felly (8) surrounded by a tire (9) preferably of the cushion type, as in automobile wheels.

The ends of the sleeve are threaded to receive the rings (10) (10) which extend transversely of the rings and are preferably of a diameter equal to the diameter of the collars (4) (4ª), between which the rings are located, wearing washers (11) being interposed between the inner faces of the collars and the rings (10) (10), the diameter of the apertures through the rings being considerably larger than the diameter of the skein. The skein, collars, sleeve and rings constitute the hub of the wheel, and rotate on the axle; a nut (12) being removably secured on the outer end of the axle to retain the wheel on the axle, the hub of the wheel lying between the flange on the axle and the nut to retain the hub and wheel against lateral movement, the ring (10) at the outer end of the sleeve lying adjacent the outer removable collar (4ª), which is faced as is collar (4).

Between the sleeve and skein and confined laterally by the depending portions of the rings (10) (10) are the cushioning devices (13) (13), the same consisting of rings preferably composed of solid rubber, which rings are received on the skein and are recessed or grooved on their inner peripheries as at (14) (14) forming a cushion to absorb shocks and jars. Although I have shown two such cushioning devices, it is obvious that I might employ a greater or less number depending upon the length of the hub and the weight of the vehicle and furthermore, the size of the grooves may be altered according to the weight of the vehicle, a heavy vehicle requiring cushions having shallower or smaller grooves than a light vehicle.

It will be observed that the inner peripheries of the cushioning rings fit the skein closely in view of which it is evident that I have provided a double cushion comprising the inherent resilience of the rings and the air confined in the grooves of such rings. The outer peripheries of the rings frictionally engage the sleeve (5) and as the skein, cushioning rings, hub and spokes all rotate, on ball bearings of the axle, it is plain that there is little wear on the cushioning rings so that they will last for a long time.

The object of cushioning the wheel and the vehicle against shocks caused by the encountering of rough or stony and uneven roads is thus attained, since the sleeve, rings and spokes are free to move transversely of the axle, owing to the large diameter of the apertures in the end rings, such transverse movement being accomplished against the resilience of the rubber cushioning rings and the air confined in the grooves of such rings, the sleeve and rings sliding easily between but guided by the collars (4) (4ª) of the skein, so that all jar and vibration are absorbed and are not transmitted to the vehicle and its occupants or contents. Furthermore, in the common form of vehicle wheel, the shock resulting from the contact of the wheel rim with a stone for instance, is a strain not only on the rim or tire of the wheel, but is transmitted to the hub, whereas in my construction, there is a yielding of the entire wheel which cushions the shock and relieves the tire and hub of strain. The hub virtually comprises two parts, the rotating skein and the sleeve and rings movable transversely thereof, there being no positive connection between the sleeve and skein.

It is obvious that a wheel of this description is applicable to all road vehicles propelled by draft animals and to motor vehicles as well, but in the latter instance, while the wheels are capable of use on the idle axle, say of such motor vehicles, it becomes necessary to provide some means whereby the motive power of such vehicle may be transmitted to the drive wheels, to which end I have devised the construction shown in Figs. 2 and 3, wherein the inner collar (4) of the skein is positively connected to the wheel to drive the latter, the motive power of the vehicle being connected to the inner collar in any suitable or convenient manner, not shown. In this construction I preferably cut away or recess a portion of the outer periphery of the inner ring (10) as shown at (15), a strong elbow stud (16) being secured to the collar and received in such recess, the outer end of the stud lying preferably parallel with the face of the collar and passing through an eye (17) secured to the inner ring (10), the extreme end of the stud being headed as at (18) to prevent its disengagement from the eye. A coil spring (19) surrounds that portion of the stud between the eye and the elbow for the purpose of cushioning shocks or jars caused by the passage of the wheel over rough and stony roads as well as to permit the wheel to yield upwardly when the stud is in a vertical or an approximately vertical position, the recess (15) permitting a movement of the sleeve and rings (10) relative to the stud.

From the foregoing, it is obvious that I have devised an extremely inexpensive, yet highly efficient device for absorbing shocks and jars which otherwise would injure and weaken the wheel and incommode the occupants of the vehicle. By means of my construction I have materially added to the life of the vehicle wheel and increased the smoothness of motion of the vehicle. Furthermore, I have provided a wheel suitable for motor vehicles which can be made at a vastly less cost than those on the market since I avoid the use of inflated tires, which are a constant source of expense and trouble, and by avoiding the use of such tires, wheels manufactured in accordance with my invention can be made larger than the present wheels in use, thereby adding to their stability, the collars (4) (4ª) and rings (10) (10) preventing any twisting of the wheel and sleeve and maintaining the wheel true at all times.

It is evident that many changes might be made in the form and arrangements of the several parts described without departing from the spirit and scope of my invention and hence I do not wish to limit myself to the exact construction herein set forth.

Having thus fully disclosed my invention, what I claim as new, is—

1. The combination with an axle, a skein mounted on the axle, collars secured to the skein, and a sleeve encircling the skein between the collars, of inwardly projecting end rings carried by the opposite ends of the sleeve, and a grooved cushioning ring U-shaped in cross section interposed between the skein and sleeve, the side edges of the ring resting on the skein and being engaged and braced by the inwardly projecting end rings, the skein operating to close the open face of the groove.

2. The combination with an axle and a skein rotatable thereon, of collars secured to the skein, a sleeve loosely surrounding the skein and capable of movement transversely of the skein, a cushioning ring interposed between the skein and sleeve, the sleeve being recessed at its periphery, an eye on the sleeve, a bar secured to the inner collar and passing through the recess in the sleeve and the eye, and a spring on the bar bearing against the eye to permit the wheel to move transversely of the axle, and positively connect the sleeve and collar.

In testimony whereof, I affix my signature in presence of two witnesses.

RICHARD JONES.

Witnesses:
A. A. EASTERLY,
RALPH S. WARFIELD.